(12) United States Patent
Malla et al.

(10) Patent No.: US 12,072,678 B2
(45) Date of Patent: Aug. 27, 2024

(54) SYSTEMS AND METHODS FOR PROVIDING FUTURE OBJECT LOCALIZATION

(71) Applicant: Honda Motor Co., Ltd., Tokyo (JP)

(72) Inventors: Srikanth Malla, Sunnyvale, CA (US); Chiho Choi, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 745 days.

(21) Appl. No.: 16/828,343

(22) Filed: Mar. 24, 2020

(65) Prior Publication Data

US 2021/0082283 A1 Mar. 18, 2021

Related U.S. Application Data

(60) Provisional application No. 62/901,216, filed on Sep. 16, 2019.

(51) Int. Cl.
*G05B 13/02* (2006.01)
*B60W 60/00* (2020.01)
(Continued)

(52) U.S. Cl.
CPC ........... *G05B 13/027* (2013.01); *G06V 10/25* (2022.01); *G06V 20/58* (2022.01); *G08G 1/123* (2013.01); *B60W 60/0027* (2020.02)

(58) Field of Classification Search
CPC ...... G08G 1/123; G08G 13/027; G08G 1/166; B60W 60/0027; G06V 10/25; G06V 20/58

See application file for complete search history.

(56) References Cited

U.S. PATENT DOCUMENTS

2018/0284785 A1* 10/2018 Berntorp ............ G06V 20/584
2019/0145784 A1* 5/2019 Ma ...................... G06V 20/56
701/448

(Continued)

OTHER PUBLICATIONS

H. Pirsiavash and D. Ramanan, "Detecting activities of daily living in first-person camera views," in 2012 IEEE Conference on Computer Vision and Pattern Recognition. IEEE, 2012, pp. 2847-2854.

(Continued)

*Primary Examiner* — Tyler J Lee
*Assistant Examiner* — Daniel Tyler Reich
(74) *Attorney, Agent, or Firm* — RANKIN, HILL & CLARK LLP

(57) ABSTRACT

In one embodiment, a system includes one or more vehicle sensors for capturing host data and a processor having modules. The data receiving module identifies one or more proximate vehicles within the environment based on one or more of the host data and proximate data received from the one or more proximate vehicles. The motion prediction module generates a first joint uncertainty distribution based on an initial joint uncertainty model and a host model distribution. The motion prediction module also samples host kinematic predictions based on the first joint uncertainty distribution and the host data. The object localization module generates a second joint uncertainty distribution based on the initial joint uncertainty model and an object prediction model distribution. The object localization module also samples proximate kinematic predictions based on the second joint uncertainty distribution and the proximate data.

16 Claims, 7 Drawing Sheets

(51) Int. Cl.
   *G06V 10/25* (2022.01)
   *G06V 20/58* (2022.01)
   *G08G 1/123* (2006.01)

(56) References Cited

U.S. PATENT DOCUMENTS

| | | | | |
|---|---|---|---|---|
| 2019/0178654 | A1* | 6/2019 | Hare | G06T 7/70 |
| 2019/0382007 | A1* | 12/2019 | Casas | G06V 10/764 |
| 2020/0150601 | A1* | 5/2020 | Valpola | G05B 13/04 |
| 2022/0101549 | A1* | 3/2022 | Sadeghi | G06V 20/58 |

OTHER PUBLICATIONS

Amir Rasouli, Iuliia Kotseruba, Toni Kunic, and John K. Tsotsos. "Pie: A large-scale dataset and models for pedestrian intention estimation and trajectory prediction." In the IEEE International Conference on Computer Vision (ICCV), Oct. 2019.

Amir Rasouli, Iuliia Kotseruba, and John K Tsotsos. "Are they going to cross? a benchmark dataset and baseline for pedestrian crosswalk behavior." In Proceedings of the IEEE International Conference on Computer Vision, pp. 206-213, 2017.

Nicholas Rhinehart, Kris M Kitani, and Paul Vernaza. "R2p2: A reparameterized pushforward policy for diverse, precise generative path forecasting." In Proceedings of the European Conference on Computer Vision (ECCV), pp. 772-788, 2018.

Alexandre Robicquet, Amir Sadeghian, Alexandre Alahi, and Silvio Savarese. "Learning social etiquette: Human trajectory understanding in crowded scenes." In European conference on computer vision, pp. 549-565. Springer, 2016.

C. Schöller, V. Aravantinos, F. Lay, and A. Knoll, "The simpler the better: Constant velocity for pedestrian motion prediction," arXiv preprint arXiv:1903.07933, 2019.

Gunnar A Sigurdsson, Abhinav Gupta, Cordelia Schmid, Ali Farhadi, and Karteek Alahari. "Actor and observer: Joint modeling of first and third-person videos." In Proceedings of the IEEE Conference on Computer Vision and Pattern Recognition, pp. 7396-7404, 2018.

Gunnar A. Sigurdsson, Gül Varol, Xiaolong Wang, Ali Farhadi, Ivan Laptev, and Abhinav Gupta. "Hollywood in homes: Crowdsourcing data collection for activity understanding." In European Conference on Computer Vision, 2016.

Karen Simonyan and Andrew Zisserman. "Two-stream convolutional networks for action recognition in videos." In Advances in neural information processing systems, pp. 568-576, 2014.

Chaoming Song, Zehui Qu, Nicholas Blumm, and Albert-László Barabási. "Limits of predictability in human mobility." Science, 327(5968):1018-1021, 2010.

H. Soo Park, J.-J. Hwang, Y. Niu, and J. Shi, "Egocentric future localization," in Proceedings of the IEEE Conference on Computer Vision and Pattern Recognition, 2016, pp. 4697-4705.

Khurram Soomro, Amir Roshan Zamir, and Mubarak Shah. "Ucf101: A dataset of 101 human actions classes from videos in the wild." arXiv preprint arXiv:1212.0402, 2012.

S. Su, J. Pyo Hong, J. Shi, and H. Soo Park, "Predicting behaviors of basketball players from first person videos," in Proceedings of the IEEE Conference on Computer Vision and Pattern Recognition, 2017, pp. 1501-1510.

Chen Sun, Abhinav Shrivastava, Carl Vondrick, Kevin Murphy, Rahul Sukthankar, and Cordelia Schmid. "Actor-centric relation network." In Proceedings of the European Conference on Computer Vision (ECCV), pp. 318-334, 2018.

Du Tran, Lubomir Bourdev, Rob Fergus, Lorenzo Torresani, and Manohar Paluri. "Learning spatiotemporal features with 3d convolutional networks." In Proceedings of the IEEE international conference on computer vision, pp. 4489-4497, 2015.

I. Ulrich and J. Borenstein, "Vfh+: Reliable obstacle avoidance for fast mobile robots," in Proceedings. 1998 IEEE International conference on robotics and automation (Cat. No. 98CH36146), vol. 2. IEEE, 1998, pp. 1572-1577.

Gül Varol, Ivan Laptev, and Cordelia Schmid. "Long-term temporal convolutions for action recognition." IEEE transactions on pattern analysis and machine intelligence, 40(6):1510-1517, 2017.

D. Vasquez, F. Large, T. Fraichard, and C. Laugier, "High-speed autonomous navigation with motion prediction for unknown moving obstacles," in 2004 IEEE/RSJ International Conference on Intelligent Robots and Systems (IROS) (IEEE Cat. No. 04CH37566), vol. 1. IEEE, 2004, pp. 82-87.

A. Vemula, K. Muelling, and J. Oh, "Social attention: Modeling attention in human crowds," in 2018 IEEE International Conference on Robotics and Automation (ICRA). IEEE, 2018, pp. 1-7.

Xiaolong Wang, Ross Girshick, Abhinav Gupta, and Kaiming He. "Non-local neural networks." In Proceedings of the IEEE Conference on Computer Vision and Pattern Recognition, pp. 7794-7803, 2018.

M. Xu, C. Fan, Y. Wang, M. S. Ryoo, and D. J. Crandall, "Joint person segmentation and identification in synchronized first-and third-person videos," in Proceedings of the European Conference on Computer Vision (ECCV), 2018, pp. 637-652.

Yanyu Xu, Zhixin Piao, and Shenghua Gao. "Encoding crowd interaction with deep neural network for pedestrian trajectory prediction." In Proceedings of the IEEE Conference on Computer Vision and Pattern Recognition, pp. 5275-5284, 2018.

T. Yagi, K. Mangalam, R. Yonetani, and Y. Sato, "Future person localization in first-person videos," in Proceedings of the IEEE Conference on Computer Vision and Pattern Recognition, 2018, pp. 7593-7602.

Y. Yao, M. Xu, C. Choi, D. J. Crandall, E. M. Atkins, and B. Dariush, "Egocentric vision-based future vehicle localization for intelligent driving assistance systems," arXiv preprint arXiv:1809.07408, 2018.

Wei Zhan, Liting Sun, Di Wang, Haojie Shi, Aubrey Clausse, Maximilian Naumann, Julius Kummerle, Hendrik Konigshof, Christoph Stiller, Arnaud de La Fortelle, et al. "Interaction dataset: An international, adversarial and cooperative motion dataset in interactive driving scenarios with semantic maps." arXiv preprint arXiv:1910.03088, 2019.

Pu Zhang, Wanli Ouyang, Pengfei Zhang, Jianru Xue, and Nanning Zheng. "Sr-lstm: State refinement for lstm towards pedestrian trajectory prediction." In Proceedings of the IEEE Conference on Computer Vision and Pattern Recognition, pp. 12085-12094, 2019.

A. Alahi, K. Goel, V. Ramanathan, A. Robicquet, L. Fei-Fei, and S. Savarese, "Social lstm: Human trajectory prediction in crowded spaces," in Proceedings of the IEEE conference on computer vision and pattern recognition, 2016, pp. 961-971.

S. Ardeshir and A. Borji, "Ego2top: Matching viewers in egocentric and top-view videos," in European Conference on Computer Vision. Springer, 2016, pp. 253-268.

G. Bertasius, H. S. Park, S. X. Yu, and J. Shi, "First person action-object detection with egonet," arXiv preprint arXiv:1603.04908, 2016.

Apratim Bhattacharyya, Mario Fritz, and Bernt Schiele. "Long-term on-board prediction of people in traffic scenes under uncertainty." In Proceedings of the IEEE Conference on Computer Vision and Pattern Recognition, pp. 4194-4202, 2018.

Holger Caesar, Varun Bankiti, Alex H Lang, Sourabh Vora, Venice Erin Liong, Qiang Xu, Anush Krishnan, Yu Pan, Giancarlo Baldan, and Oscar Beijbom. nuscenes: A multimodal dataset for autonomous driving.: arXiv preprint arXiv:1903.11027, 2019.

Joao Carreira and Andrew Zisserman. "Quo vadis, action recognition? a new model and the kinetics dataset." In proceedings of the IEEE Conference on Computer Vision and Pattern Recognition, pp. 6299-6308, 2017.

Rohan Chandra, Uttaran Bhattacharya, Aniket Bera, and Dinesh Manocha. "Traphic: Trajectory prediction in dense and heterogeneous traffic using weighted interactions." In Proceedings of the IEEE Conference on Computer Vision and Pattern Recognition, pp. 8483-8492, 2019.

Ming-Fang Chang, John Lambert, Patsorn Sangkloy, Jagjeet Singh, Slawomir Bak, Andrew Hartnett, De Wang, Peter Carr, Simon Lucey, Deva Ramanan, et al. "Argoverse: 3d tracking and forecasting with rich maps." In Proceedings of the IEEE Conference on Computer Vision and Pattern Recognition, pp. 8748-8757, 2019.

(56) References Cited

OTHER PUBLICATIONS

C. Choi and B. Dariush, "Looking to relations for future trajectory forecast," arXiv preprint arXiv:1905.08855, 2019.
C. Choi, A. Patil, and S. Malla, "Drogon: A causal reasoning framework for future trajectory forecast," arXiv preprint arXiv:1908.00024, 2019.
J. S. Denker and Y. Lecun, "Transforming neural-net output levels to probability distributions," in Advances in neural Information processing systems, 1991, pp. 853-859.
Nachiket Deo and Mohan M Trivedi. "Multi-modal trajectory prediction of surrounding vehicles with maneuver based lstms." In 2018 IEEE Intelligent Vehicles Symposium (IV), pp. 1179-1184. IEEE, 2018.
C. Fan, J. Lee, M. Xu, K. Kumar Singh, Y. Jae Lee, D. J. Crandall, and M. S. Ryoo, "Identifying first-person camera wearers in third-person videos," in Proceedings of the IEEE Conference on Computer Vision and Pattern Recognition, 2017, pp. 5125-5133.
A. Fathi and A. Farhadi, "Rj: Understanding egocentric activities. computer vision (iccv)," in 2011 IEEE International Conference on IEEE, 2011.
K. Fujimura and H. Samet, "Time-minimal paths among moving obstacles," in Proceedings, 1989 International Conference on Robotics and Automation. IEEE, 1989, pp. 1110-1115.
Y. Gal, "Uncertainty in deep learning," Ph.D. dissertation, PhD thesis, University of Cambridge, 2016.
Y. Gal and Z. Ghahramani, "Bayesian convolutional neural networks with bernoulli approximate variational inference," arXiv preprint arXiv:1506.02158, 2015.
Y. Gal, Z. Ghahramani, "Dropout as a bayesian approximation: Representing model uncertainty in deep learning," in International Conference on Machine Learning, 2016, pp. 1050-1059.
Andreas Geiger, Philip Lenz, Christoph Stiller, and Raquel Urtasun. "Vision meets robotics: The kitti dataset." The International Journal of Robotics Research, 32(11):1231-1237, 2013.
Chunhui Gu, Chen Sun, David A Ross, Carl Vondrick, Caroline Pantofaru, Yeqing Li, Sudheendra Vijayanarasimhan, George Toderici, Susanna Ricco, Rahul Sukthankar, et al. "Ava: A video dataset of spatio-temporally localized atomic visual actions." In Proceedings of the IEEE Conference, 6056, 2018.
A. Gupta, J. Johnson, L. Fei-Fei, S. Savarese, and A. Alahi, "Social gan: Socially acceptable trajectories with generative adversarial networks," in Proceedings of the IEEE Conference on Computer Vision and Pattern Recognition, 2018, pp. 2255-2264.
Kensho Hara, Hirokatsu Kataoka, and Yutaka Satoh. "Can spatiotemporal 3d cnns retrace the history of 2d cnns and magenet?" In Proceedings of the IEEE conference on Computer Vision and Pattern Recognition, pp. 6546-6555, 2018.
K. Hashimoto, T. Kimoto, T. Ebine, and H. Kimura, "Manipulator control with image-based visual servo," in Proceedings. 1991 IEEE International Conference on Robotics and Automation. IEEE, 1991, pp. 2267-2271.
Fabian Caba Heilbron, Victor Escorcia, Bernard Ghanem, and Juan Carlos Niebles. "Activitynet: A large-scale video benchmark for human activity understanding." In Proceedings of the IEEE Conference on Computer Vision and Pattern Recognition, pp. 961-970, 2015.
Noureldien Hussein, Efstratios Gavves, and Arnold WM Smeulders. "Timeception for complex action recognition." In Proceedings of the IEEE Conference on Computer Vision and Pattern Recognition, pp. 254-263, 2019.
Andrej Karpathy, George Toderici, Sanketh Shetty, Thomas Leung, Rahul Sukthankar, and Li Fei-Fei. "Large-scale video classification with convolutional neural networks." In Proceedings of the IEEE conference on Computer Vision and Pattern Recognition, pp. 1725-1732, 2014.
A. Kendall and Y. Gal, "What uncertainties do we need in bayesian deep learning for computer vision?" in Advances in neural information processing systems, 2017, pp. 5574-5584.
R. Kesten, M. Usman, J. Houston, T. Pandya, K. Nadhamuni, A. Ferreira, M. Yuan, B. Low, A. Jain, P. Ondruska, S. Omari, S. Shah, A. Kulkarni, A. Kazakova, C. Tao, L. Platin-sky, W. Jiang, and V. Shet. "Lyft level 5 av dataset 2019." https://level5.lyft.com/dataset/, 2019.
K. M. Kitani, T. Okabe, Y. Sato, and A. Sugimoto, "Fast unsupervised ego-action learning for first-person sports videos," in CVPR 2011. IEEE, 2011, pp. 3241-3248.
H. Kuehne, H. Jhuang, E. Garrote, T. Poggio, and T. Serre. "HMDB: a large video database for human motion recognition." In Proceedings of the International Conference on Computer Vision (ICCV), 2011.
Tian Lan, Tsung-Chuan Chen, and Silvio Savarese. "A hierarchical representation for future action prediction." In European Conference on Computer Vision, pp. 689-704. Springer, 2014.
N. Lee, W. Choi, P. Vernaza, C. B. Choy, P. H. Torr, and M. Chandraker, "Desire: Distant future prediction in dynamic scenes with interacting agents," in Proceedings of the IEEE Conference on Computer Vision and Pattern Recognition, 2017, pp. 336-345.
Y. J. Lee, J. Ghosh, and K. Grauman, "Discovering important people and objects for egocentric video summarization," In 2012 IEEE Conference on Computer Vision and Pattern Recognition. IEEE, 2012, pp. 1346-1353.
Y. J. Lee and K. Grauman, "Predicting important objects for egocentric video summarization," International Journal of Computer Vision, vol. 114, No. 1, pp. 38-55, 2015.
Alon Lerner, Yiorgos Chrysanthou, and Dani Lischinski. "Crowds by example." In Computer graphics forum, vol. 26, pp. 655-664. Wiley Online Library, 2007.
Y. Li, A. Fathi, and J. M. Rehg, "Learning to predict gaze in egocentric video," in Proceedings of the IEEE International Conference on Computer Vision, 2013, pp. 3216-3223.
Jiachen Li, Hengbo Ma, and Masayoshi Tomizuka. "Conditional generative neural system for probabilistic trajectory prediction." In 2019 IEEE Conference on Robotics and Systems (IROS), 2019.
Jiachen Li, Hengbo Ma, and Masayoshi Tomizuka. "Interaction-aware multi-agent tracking and probabilistic behavior prediction via adversarial learning." In 2019 IEEE International Conference on Robotics and Automation (ICRA). IEEE, 2019.
Y. Li, Z. Ye, and J. M. Rehg, "Delving into egocentric actions," in Proceedings of the IEEE Conference on Computer Vision and Pattern Recognition, 2015, pp. 287-295.
M. Ma, H. Fan, and K. M. Kitani, "Going deeper into first-person activity recognition," in Proceedings of the IEEE Conference on Computer Vision and Pattern Recognition, 2016, pp. 1894-1903.
Yuexin Ma, Xinge Zhu, Sibo Zhang, Ruigang Yang, Wenping Wang, and Dinesh Manocha. "Trafficpredict: Trajectory prediction for heterogeneous traffic-agents." In Proceedings of the AAAI Conference on Artificial Intelligence, vol. 33, pp. 6120-6127, 2019.
D. J. Mackay, "A practical bayesian framework for backpropagation networks," Neural computation, vol. 4, No. 3, pp. 148-472, 1992.
Srikanth Malla and Chiho Choi. "Nemo: Future object localization using noisy ego priors." arXiv preprint arXiv:1909.08150, 2019.
Y. Mezouar and F. Chaumette, "Path planning for robust image-based control," IEEE Transactions on Robotics and Automation, vol. 18, No. 4, pp. 534-549, 2002.
R. Mur-Artal and J. D. Tardós, "Orb-slam2: An open-source slam system for monocular, stereo, and rgb-d cameras," IEEE Transactions on Robotics, vol. 33, No. 5, pp. 1255-1262, 2017.
N. Nikhil and B. Tran Morris, "Convolutional neural network for trajectory prediction," in Proceedings of the European Conference on Computer Vision (ECCV), 2018, pp. 0-0.
Sangmin Oh, Anthony Hoogs, Amitha Perera, Naresh Cuntoor, Chia-Chih Chen, Jong Taek Lee, Saurajit Mukherjee, JK Aggarwal, Hyungtae Lee, Larry Davis, et al. "A largescale benchmark dataset for event recognition in surveillance video." In CVPR 2011, pp. 3153-3160. IEEE, 2011.
Seong Hyeon Park, ByeongDo Kim, Chang Mook Kang, Chung Choo Chung, and Jun Won Choi. "Sequence-to-sequence prediction of vehicle trajectory via lstm encoder-decoder architecture." In 2018 IEEE Intelligent Vehicles Symposium (IV), pp. 1672-1678. IEEE, 2018.
A. Patil, S. Malla, H. Gang, and Y.-T. Chen, "The h3d dataset for full-surround 3d multi-object detection and tracking in crowded urban scenes," arXiv preprint arXiv:1903.01568, 2019.

(56) References Cited

OTHER PUBLICATIONS

Stefano Pellegrini, Andreas Ess, and Luc Van Gool. "Improving data association by joint modeling of pedestrian trajecories and groupings." In European conference on computer vision, pp. 452-465. Springer, 2010.

* cited by examiner

SYSTEMS AND METHODS FOR PROVIDING FUTURE OBJECT LOCALIZATION

CROSS-REFERENCE TO RELATED APPLICATION

This application claims priority to U.S. Provisional Application Ser. No. 62/901,216 filed on Sep. 16, 2019, which is expressly incorporated herein by reference.

BACKGROUND

Predicting the future motion of agents in dynamic environments is one of the important tasks in vehicle control and vehicle navigation. Typically, a distribution of all possible paths is modeled to tackle the multi-modality of future forecast. However, such predict distribution is either naively learned in a data driven manner with no consideration of the uncertainty or simply generated to same different types of motion using deep generative models. Additionally, single-modal future forecasting has been performed, however the uncertainty of such models is restricted to be epistemic and overlooks noise inherent in the dataset, which is infeasible to recover from a small number of the observations. Also, such models are not practical to deploy in autonomous driving (AD) and advanced driving assistance systems (ADAS).

BRIEF DESCRIPTION

According to one aspect, a system for future object localization is described. The system includes one or more vehicle sensors for capturing host data and a processor. The processor includes a data receiving module, a motion prediction module, and an object localization module. The data receiving module identifies one or more proximate vehicles within the environment based on one or more of the host data and proximate data received from the one or more proximate vehicles. The motion prediction module generates a first joint uncertainty distribution based on an initial joint uncertainty model and a host model distribution. The motion prediction module also samples host kinematic predictions based on the first joint uncertainty distribution and the host data. The object localization module generates a second joint uncertainty distribution based on the initial joint uncertainty model and an object prediction model distribution. The object localization module also samples proximate kinematic predictions based on the second joint uncertainty distribution and the proximate data.

According to another aspect, a computer implemented method for future object localization is provided. The method includes receiving host data from a host vehicle and proximate data from one or more proximate vehicles. The host data includes a first series of image frames of an environment from the host vehicle. The method also includes generating a first joint uncertainty distribution based on an initial joint uncertainty model and a host model distribution. The method further includes sampling host kinematic predictions based on the first joint uncertainty distribution and the host data. The method yet further includes generating a second joint uncertainty distribution based on the initial joint uncertainty model and an object prediction model distribution. The method includes sampling proximate kinematic predictions based on the second joint uncertainty distribution and the proximate data. The method further includes displaying predicted trajectories of the one or more proximate vehicles based on the host kinematic predictions and the proximate kinematic predictions.

According to still another aspect, a non-transitory computer readable storage medium storing instructions that when executed by a computer, which includes a processor perform a method associated with future object localization. The method includes receiving host data from a host vehicle and proximate data from one or more proximate vehicles. The host data includes a first series of image frames of an environment from the host vehicle. The method also includes generating a first joint uncertainty distribution based on an initial joint uncertainty model and a host model distribution. The method further includes sampling host kinematic predictions based on the first joint uncertainty distribution and the host data. The method yet further includes generating a second joint uncertainty distribution based on the initial joint uncertainty model and an object prediction model distribution. The method includes sampling proximate kinematic predictions based on the second joint uncertainty distribution and the proximate data. The method further includes displaying predicted trajectories of the one or more proximate vehicles based on the host kinematic predictions and the proximate kinematic predictions.

DETAILED DESCRIPTION

Figure 1:
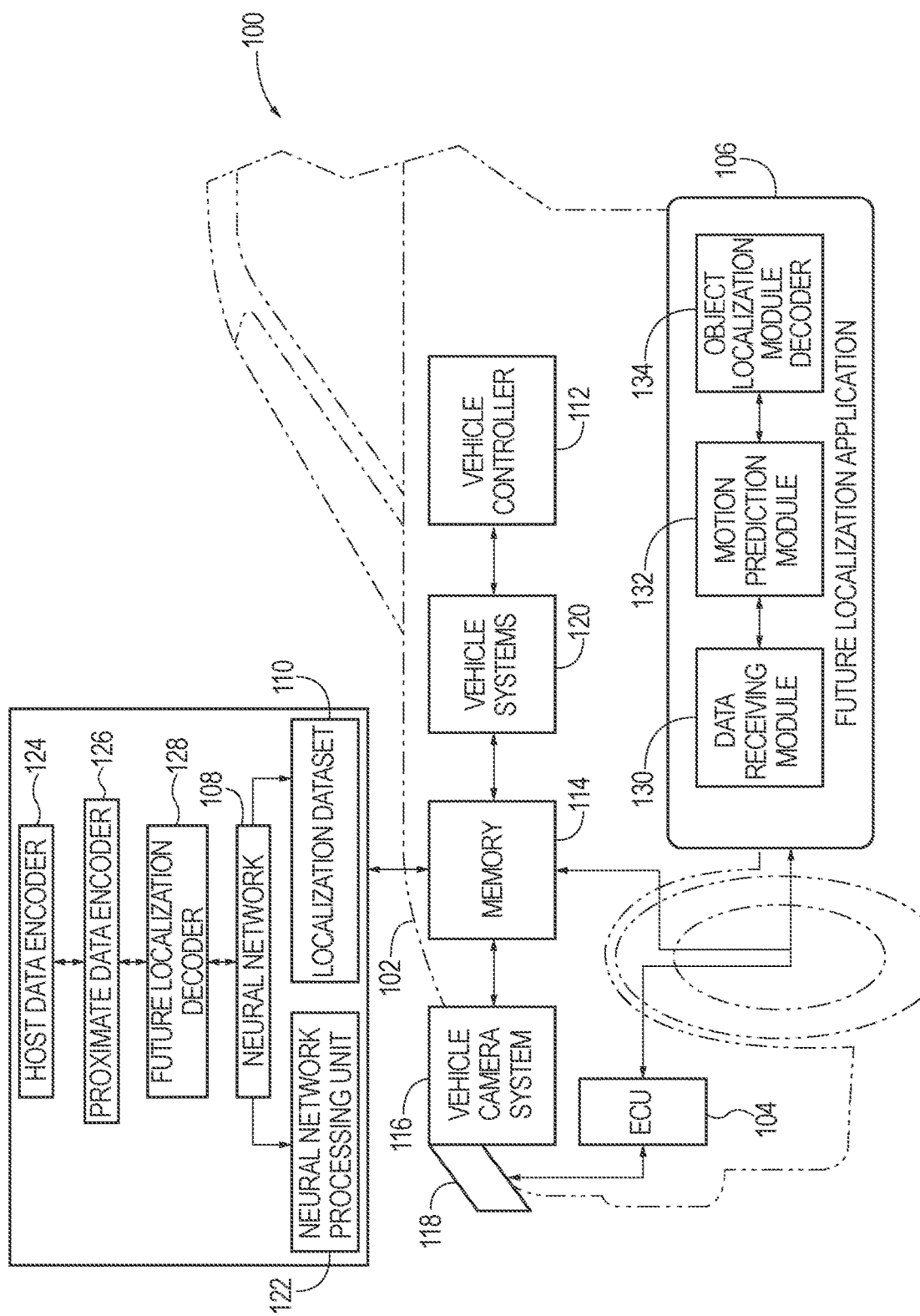
FIG. 1 is a component diagram of a system for future object localization, according to one aspect.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. Computer communication may also include an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Object", as used herein, refers to any items in the roadway and may include proximate vehicles, pedestrians crossing the roadway, other vehicles, obstacles, animals, debris, potholes, etc. Further, an 'object may include most any traffic conditions, road conditions, weather conditions, etc. Examples of objects may include, but are not necessarily limited to other vehicles (e.g., proximate vehicle), buildings, landmarks, obstructions in the roadway, road segments, intersections, etc. Thus, objects may be found, detected, or associated with a path, one or more road segments, etc. along a route on which a host vehicle is travelling or is projected to travel along.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, drones, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. SYSTEM OVERVIEW

Referring now to the drawings, wherein the showings are for purposes of illustrating one or more exemplary embodiments and not for purposes of limiting same, FIG. 1 is a schematic view of the operating environment 100 for implementing systems and methods for future object localization according to an exemplary embodiment of the present disclosure. The components of the operating environment 100, as well as the components of other systems, hardware architectures, and software architectures discussed herein, may be combined, omitted, or organized into different architectures for various embodiments.

Figure 2:
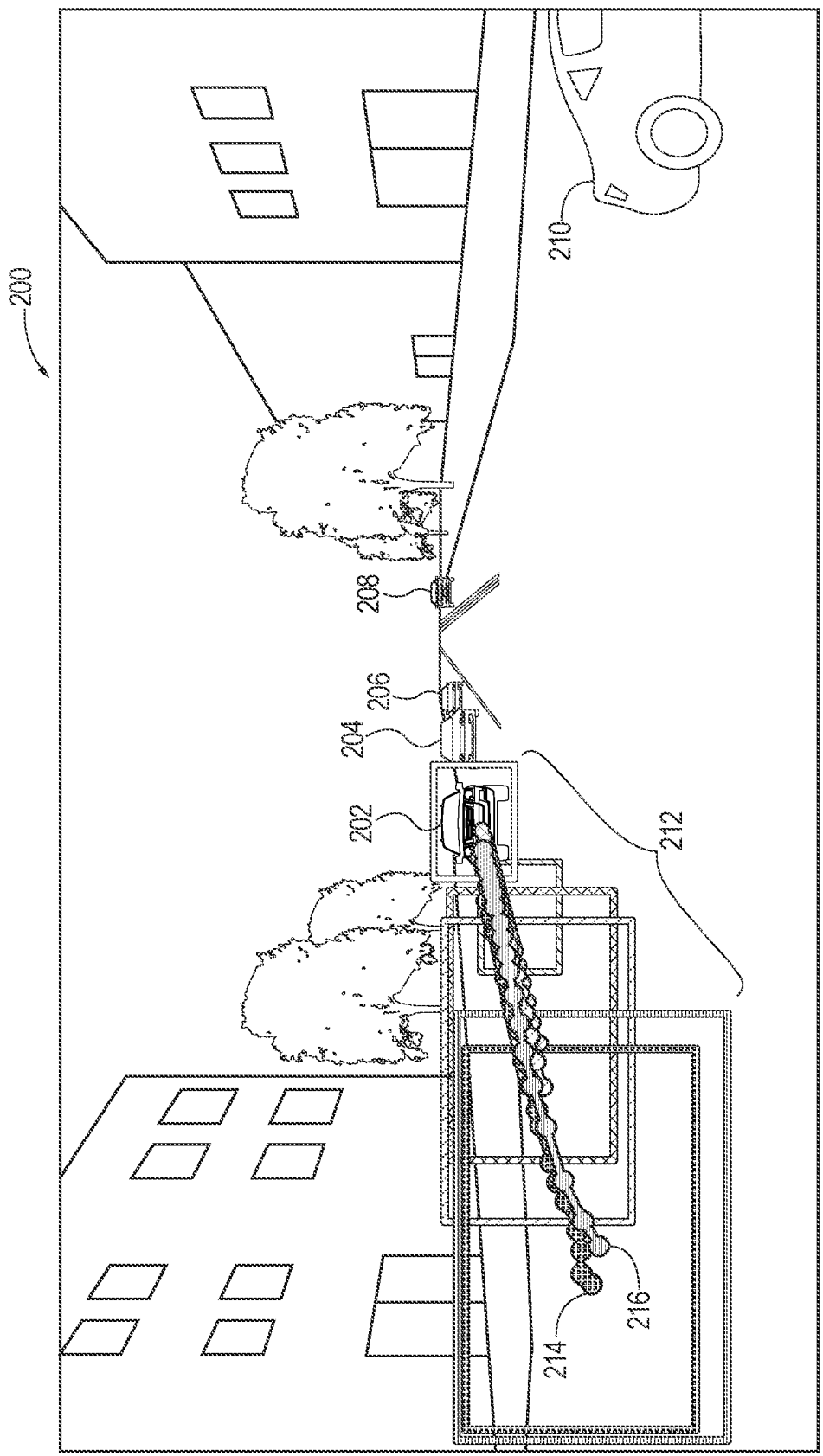
FIG. 2 is an exemplary diagram of temporal predictions or predictions associated with object localization, according to one aspect.

Generally, the operating environment 100 includes a host vehicle 102 with an electronic control unit (ECU) 104 that executes one or more applications, operating systems, vehicle system and subsystem user interfaces, among others. The ECU 104 may also execute a future localization application 106 that may be configured to complete future localization of one or more objects, such as proximate vehicles and/or pedestrians. For example, turning to FIG. 2, the vehicle environment 200 includes proximate vehicles 202, 204, 206, 208, and 210. While the embodiments described are vehicle examples for clarity, shown as vehicles, the systems and methods for future object localization may also be applied to other embodiments, such as robotics, path planning, and swarm management, among others.

The future localization may include a prediction of future locations, positions, scales, depths, motions, and trajectories of one or more of the proximate vehicles 202-210 located within the surrounding environment 200 of the host vehicle 102. The surrounding environment may include an area including a vicinity of the host vehicle 102. For example, the surrounding environment of the host vehicle 102 may include any number of traffic configurations, for example, an intersection at which the host vehicle 102 is located (e.g., stopped) and/or a roadway on which the host vehicle 102 is driven (e.g., lane of a highway).

The future localization application 106 may communicate with and utilize a neural network 108 to encode temporal information to provide location and scale information pertaining to the host vehicle 102 and the one or more proximate vehicles located within the surrounding environment 200 of the host vehicle 102. For example, the host positions, host motions, location, and/or scale information pertaining to the host vehicle 102 is host data and the proximate positions, proximate motions, location and/or scale information pertaining to one or more of the proximate vehicles 202-210 is proximate data. Accordingly, the future localization application 106 may utilize the neural network 108 to encode the host data and the proximate data. Suppose that the host data includes a dense optical flow to provide pixel-level information about proximate vehicle motion, scale change, and appearance.

The future localization application 106 may further utilize the neural network 108 to decode the encoded host data and proximate data to generate a localization dataset 110, including a joint uncertainty model. The future localization application 106 may also combine the encoded host data and proximate data to thereby output a change in a predicted future location of a predicted future bounding box associated with one or more of the proximate vehicles 202-210 within the surrounding environment 200 of the host vehicle 102.

In some embodiments, the future localization application 106 may also input data provided by a vehicle controller 112 of the host vehicle 102 that pertains to motion of the host vehicle 102 that may also be provided to the neural network 108 to decode and output information pertaining to predicted bounding boxes. The future localization application 106 may also process information from various sources provided as inputs and may utilize the neural network 108 to provide various functions, that may include, but is not limited to object classification, feature recognition, multilayer perceptions, and autonomous driving commands.

The neural network 108 may be configured as a multistream Recurrent Neural Network (RNN) and may include an encoder-decoder structure that includes a plurality of fully connected layers. Alternatively, the neural network 108 may be configured as a convolutional neural network (CNN). The neural network 108 may utilize machine learning/deep learning to provide artificial intelligence capabilities. For example, the neural network 108 may utilize machine learning/deep learning to encode the temporal information and optical flow information from past observations and decode predicted future bounding boxes based on images of the surrounding environment 200 of the host vehicle 102.

The neural network 108 may be configured to process the future vehicle localization information from the decoded predicted future bounding boxes and may build and maintain the localization dataset 110 that may be collected for one or more roadway environmental scenarios (e.g., intersection scenarios). In some embodiments, the future localization application 106 may access and analyze the localization dataset 110 to provide motion planning capabilities while executing autonomous driving commands that may be provided to autonomously control the host vehicle 102 to preemptively adapt to predicted future locations, positions, scales, depths, and trajectories of one or more proximate vehicles within the surrounding environment 200 and/or the host vehicle 102. In additional embodiments, the future localization application 106 may access and analyze the localization dataset 110 to provide warnings to a driver of the host vehicle 102 that may be provided to alert the driver for preemptive collision avoidance purposes based on the predicted future locations, positions, scales, depths, and trajectories of one or more proximate vehicles within the surrounding environment 200 and/or the host vehicle 102.

With continued reference to FIG. 1, in addition to the ECU 104 and the vehicle controller 112, the host vehicle 102 may include a plurality of components, for example, a memory 114, a vehicle camera system 116 that is operably connected to one or more cameras 118, and a plurality of vehicle systems 120. In an exemplary embodiment, the ECU 104 may be configured to operably control the plurality of components of the host vehicle 102.

In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the host vehicle 102. The ECU 104 may also include a communication device (not shown) for sending data internally in the host vehicle 102 and communicating with externally hosted computing systems (e.g., external to the host vehicle 102). Generally, the ECU 104 communicates with the memory 114 to execute the one or more applications, operating systems, vehicle system and subsystem user interfaces, and the like that are stored within the memory 114.

In one embodiment, the ECU 104 may operably control the vehicle controller 112 to process and execute an autonomous driving plan based on one or more of an intended destination of the host vehicle 102, one or more proximate vehicles located within the surrounding environment of the host vehicle 102, one or more future predicted locations of one or more of the proximate vehicles as determined by the future localization application 106, and/or one or more external factors that may include, but may not be limited to, a lane in which the host vehicle 102 is traveling, status of traffic signals, traffic patterns, traffic regulations, etc. As discussed below, in some embodiments, the future localization application 106 may predict a future motion of the host vehicle 102 based on the autonomous driving plan processed by the vehicle controller 112.

In one embodiment, the vehicle controller 112 may additionally provide one or more commands to one or more of the vehicle systems 120 and/or one or more control units (not shown) of the host vehicle 102, including, but not limited to an engine control unit, a braking control unit, a transmission control unit, a steering control unit, and the like to control the host vehicle 102 to be autonomously driven based on the autonomous driving plan and/or data communicated by the future localization application 106 to autonomously or semi-autonomously control the host vehicle 102. In other words, the host vehicle 102 may be autonomously driven based on one or more factors that may influence the autonomous driving plan (e.g., lane in which the host vehicle 102 is traveling, status of traffic signals, traffic patterns, traffic regulations, etc.) and/or to preemptively adapt to predicted locations, positions, scales, depths, and trajectories of one or more proximate vehicles within the surrounding environment 200 based on encoding and decoding final hidden states output by the neural network 108. In another embodiment, suppose that the host vehicle is a robot, the robot may traverse an environment based on the one or more factors that influence the path plan to adapt to one or more objects in the surrounding environment 200 of the robot.

The memory 114 may be configured to store one or more executable files associated with one or more operating systems, applications, associated operating system data, application data, vehicle system and subsystem user interface data, and the like that are executed by the ECU 104. In one or more embodiments, the memory 114 of the host vehicle 102 may be accessed by the future localization application 106 to store data, for example, a first series of image frames of the surrounding environment 200 from the one or more cameras 118. In some embodiments, the memory 114 may include one or more traffic participant models, as will be discussed below, associated with one or more types of proximate vehicles that represent values that include a range of sizes and features (based on image data) that are associated to different types of proximate vehicles.

In an exemplary embodiment, the memory 114 may include components of the neural network 108. As discussed above, the neural network 108 may be configured as a RNN that is configured to process computer/machine based/deep learning that may be centered on one or more forms of data that are provided to the neural network 108. In addition to being hosted on the memory 114, in some embodiments, the neural network 108, subsets of the neural network 108, and/or subsets of data may be used by the neural network 108 may be hosted on an externally hosted server infrastructure (not shown) that may be configured to communicate with the ECU 104 of the host vehicle 102 through the communication device of the ECU 104.

In one or more embodiments, the neural network 108 may include a neural network processing unit 122 that may provide processing capabilities to be configured to utilize machine learning/deep learning to provide artificial intelligence capabilities that may be utilized to output data to the future localization application 106 and to build and maintain the localization dataset 110. The neural network processing unit 122 may process information that is provided as inputs and may utilize the localization dataset 110 to access stored future localization data to provide various functions, that may include, but may not be limited to, object classification, feature recognition, computer vision, speed recognition, machine translation, autonomous driving commands, and the like.

In an exemplary embodiment, the neural network 108 may be configured as a RNN encoder-decoder structure that is operably controlled by the neural network processing unit 122 and includes a host data encoder 124, a proximate data encoder 126, and a future localization decoder 128. The host data encoder 124 and proximate data encoder 126 may be configured as gated recurrent unit encoders. In an exemplary embodiment, the host data encoder 124 may be configured to encode the host data. The host data may include past observations captured within one or more images with respect to the past bounding box trajectory of the one or more proximate vehicles 202-210 located within the surrounding environment 200. The host data encoder 124 may thereby provide location and scale information pertaining to both the host vehicle 102 and one or more proximate vehicles 202-210 located within the surrounding environment of the host vehicle 102.

The proximate data encoder 126 may be configured to encode dense optical flow information of motion, scale, and/or appearance change of one or more proximate vehicles and background captured within one or more images. As discussed below, the future localization application 106 may be configured to fuse the data output by the host data encoder 124 and the proximate data encoder 126 to provide the encoded past location, scale, and corresponding optical flow fields of each of the one or more proximate vehicles located within the surrounding environment of the host vehicle 102. The fused data may be communicated to the future localization decoder 128 to extrapolate future bounding box trajectories of each of the one or more proximate vehicles located within the surrounding environment 200.

More specifically, the future localization decoder 128 may be configured to generate a joint uncertainty model as will be described in greater detail with respect to method 300 of FIG. 3 and method 400 of FIG. 4. Likewise, the future localization decoder 128 may be configured to decode future bounding boxes based on the one or more images of the surrounding environment 200. The proximate data encoder 126 to decode future bounding boxes to thereby allow the future localization application 106 to output predicted locations, positions, scales, depths, and trajectories of one or more proximate vehicles within the surrounding environment of the host vehicle 102 to be updated to the localization dataset 110.

Figure 5:
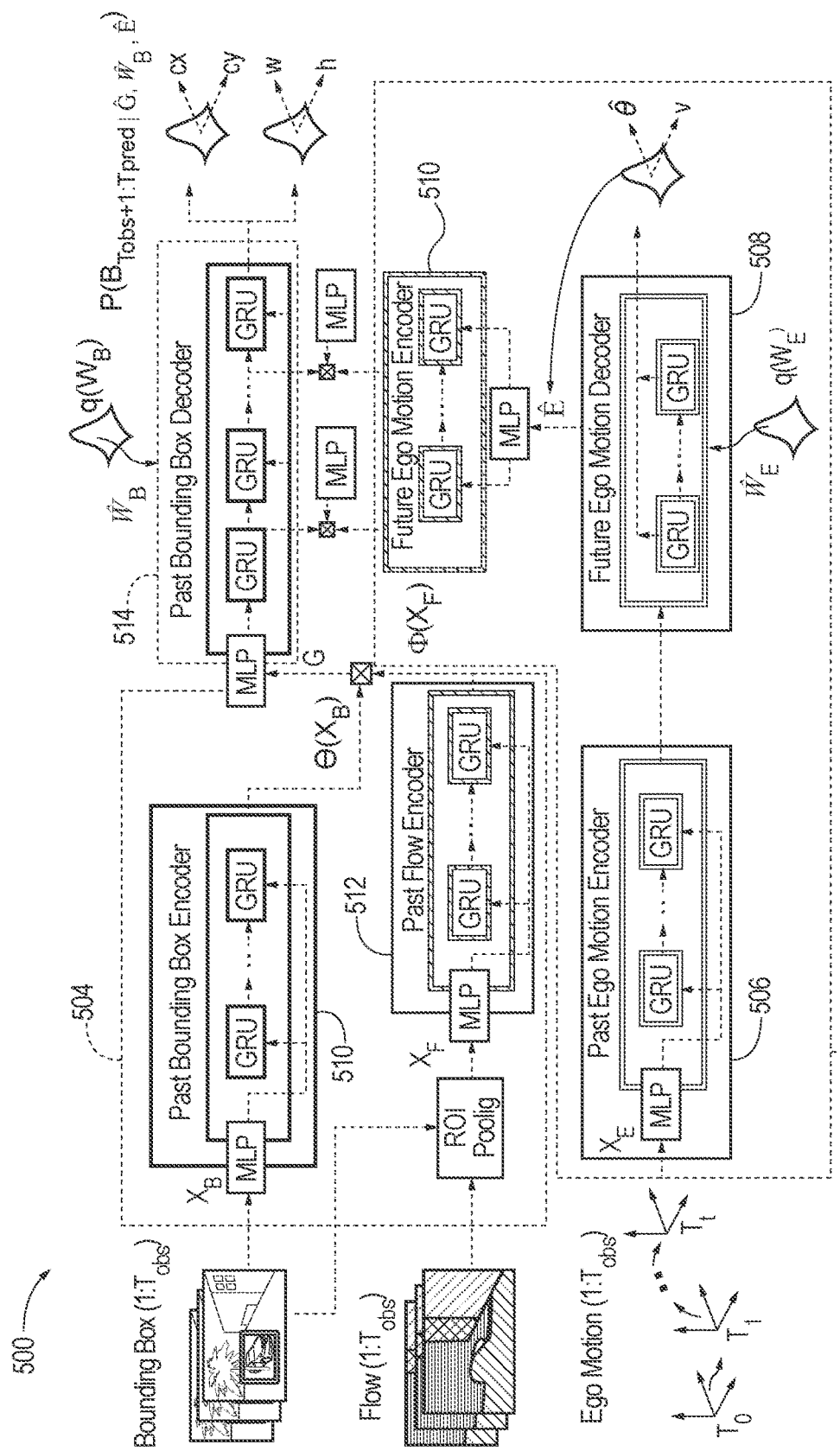
FIG. 5 is an exemplary diagram of an architecture associated with training the system for future object localization of FIG. 1.

FIG. 5 is an exemplary diagram of an architecture 500 associated with training the system for future object localization of FIG. 1. The Future ego-motion prediction stream models the uncertainty of future ego-behavior. The Future object localization stream encodes past bounding box and flow information to predict future motion of a proximate vehicle conditioned on the sampled future ego-motion of the host vehicle 102. The resulting distribution is multi-modal and uncertainty aware.

As will be discussed more detail below, based on one or more commands provided by the future localization application 106 to the neural network processing unit 122 of the neural network 108, one or more past bounding box trajectories of one or more proximate vehicles based on one or more images may be encoded by the host data encoder 124 to provide location and scale information. Therefore, the future localization application 106 utilize the neural network processing unit 122 and/or the future localization application 106 may include a processor.

The host data include a dense optical flow of a first set of images associated with the one or more proximate vehicles 202-210 located within the surrounding environment 200 of the host vehicle 102 to provide pixel level information of the motion, scale, and/or appearance change of each of the one or more proximate vehicles. In some embodiments, the future localization application 106 may additionally provide one or more commands associated with the ego-motion planning of the host vehicle 102 to the future localization decoder 128. The future localization decoder 128 may be configured to decode and predict future bounding boxes 216 associated with the one or more proximate vehicles located within the surrounding environment of the host vehicle 102. As discussed below, the future localization application 106 may thereby predict future locations, positions, scales, depths, and trajectories associated to each of the one or more proximate vehicles located within the surrounding environment of the host vehicle 102.

In some embodiments, the future predicted locations, positions, scales, depths, and trajectories of one or more proximate vehicles within the surrounding environment of the host vehicle 102 may be provided as vehicle localization data that is added to the localization dataset 110. In some configurations, the future localization application 106 may utilize the localization dataset 110 to provide motion planning capabilities while executing autonomous driving commands that may be provided to autonomously control the host vehicle 102 to preemptively adapt to the predicted locations, positions, scales, depths, and trajectories of one or more proximate vehicles within the surrounding environment of the host vehicle 102.

Referring again to FIG. 1, the vehicle camera system 116 may include one or more cameras 118 that are positioned at one or more areas of the surrounding environment of the host vehicle 102. In an exemplary embodiment, the surrounding environment of the host vehicle 102 may be defined as a predetermined area located in around (front/sides/behind) the host vehicle 102 (e.g., road environment in front, sides, and/or behind of the host vehicle 102) that may be included within the vehicle's travel path. The one or more cameras 118 of the vehicle camera system 116 may be disposed at external front portions of the host vehicle 102, including, but not limited to different portions of the vehicle dashboard, vehicle bumper, vehicle front lighting units, vehicle fenders, and the windshield. In one embodiment, the one or more cameras may be configured as RGB cameras that may capture RGB bands that are configured to capture rich information about object appearance, as well as relationships and interactions between the host vehicle 102 and objects within the surrounding environment of the host vehicle 102 which may include one or more proximate vehicles. The one or more cameras 118 may be configured to capture the images (e.g., images, videos) of the surrounding environment of the host vehicle 102 in one or more resolutions. For example, the one or more cameras 118 may be configured to capture video clips of a front facing surrounding environment of the host vehicle 102 with 1920× 1200 resolutions and 10 fps.

As discussed, image data may be provided by the vehicle camera system 116 to one or more components of the future localization application 106 to be further evaluated and processed based on utilization of the neural network 108. In some embodiments, the future localization application 106 may be configured to execute the image logic to perform feature extraction extract on the image(s). The image extraction may include the extraction of one or more spatial-temporal features and may pertain to object and scene recognition. In one embodiment, the image logic may also be utilized to determine one or more sets of image coordinates associated with one or more objects that may include, but may not be limited to, proximate vehicles (e.g., pedestrians, bikers, other vehicles), roadway attributes (e.g., lane markings, off-ramps, curbs), and road side objects (e.g., traffic light, stop sign).

In one or more embodiments, the vehicle systems 120 may include one or more systems that may be utilized to autonomously control the host vehicle 102 and/or one or more functions and features of the host vehicle 102. For example, the vehicle systems 120 may include, but are not limited to, any automatic or manual systems that may be used to enhance the vehicle driving. It is understood that the vehicle systems 120 may include various vehicle sensors (not shown) that sense and measure different stimuli (e.g., a signal, a property, a measurement, a quantity) associated with the host vehicle 102 and/or a particular vehicle system 120.

For example, some vehicle sensors may include radar and laser sensors mounted to the exterior of the host vehicle 102. The sensors may be any type of sensor, for example, acoustic, electric, environmental, optical, imaging, light, pressure, force, thermal, temperature, proximity, among others. In some embodiments, one or more of the vehicle systems 120 may include vehicle sensors for detecting objects surrounding the host vehicle 102. For example, proximity sensors, radar sensors, laser sensors, LIDAR sensors, and other optical sensors, may be used to detect objects, such as proximate vehicles, within the surrounding environment of the host vehicle 102.

The vehicle systems 120 may include Advanced Driver Assistance Systems (ADAS), for example, an adaptive cruise control system, a blind spot monitoring system, a collision mitigation system, a lane departure warning system, among others that may be utilized to provide warnings/alerts to the driver of the host vehicle 102 (e.g., if the host vehicle 102 is being driven by a driver and not autonomously) for preemptive collision avoidance purposes based on the predicted locations, positions, scales, depths, and trajectories of one or more proximate vehicles within the surrounding environment of the host vehicle 102 and/or the host vehicle 102.

II. FUTURE OBJECT LOCALIZATION APPLICATION AND RELATED METHODS

Figure 3:
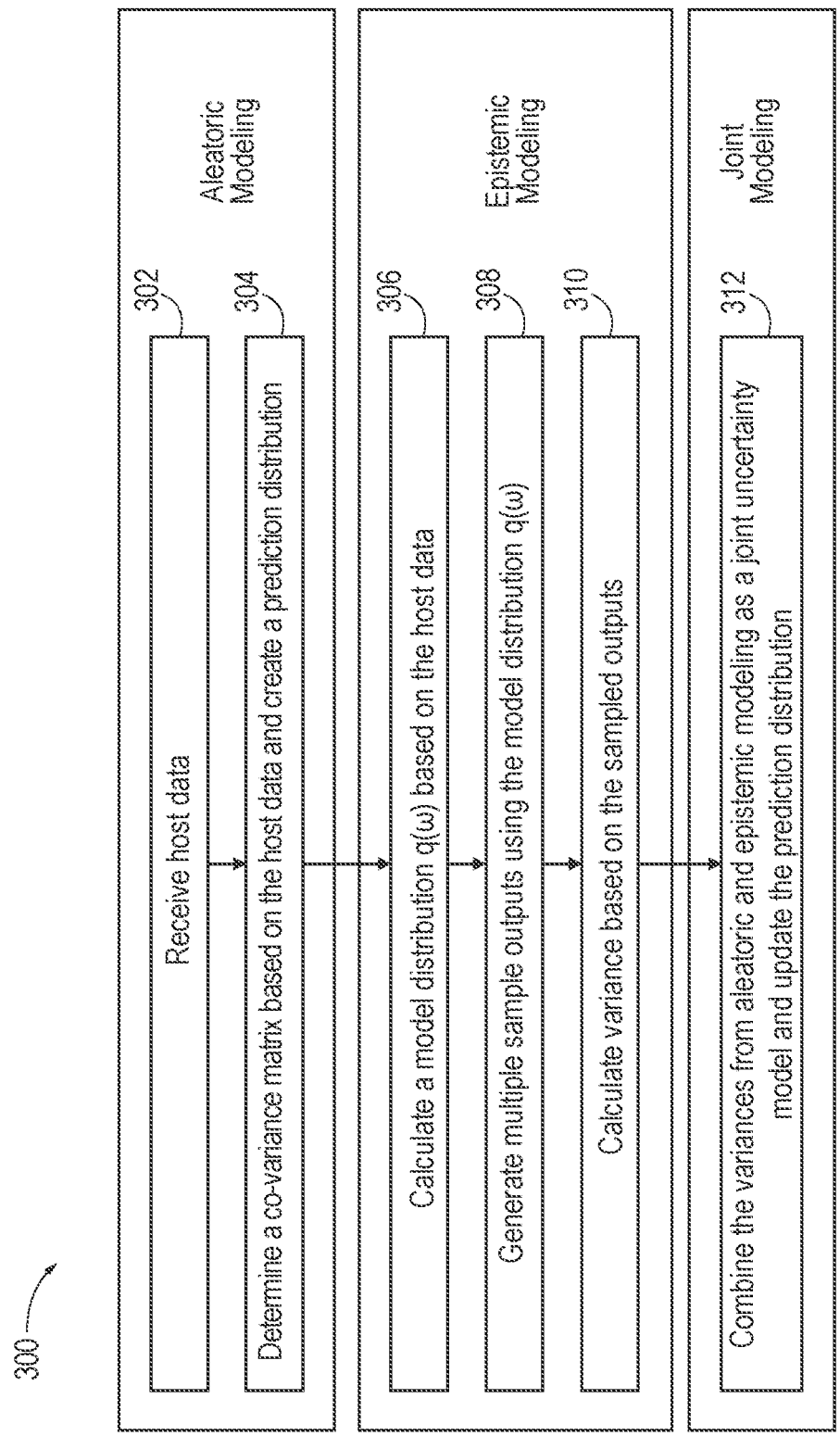
FIG. 3 is process flow for generating a joint uncertainty model associated with future object localization, according to one aspect.

Referring now to FIG. 3, a method 300 for generating a joint uncertainty model associated with future object localization according to an exemplary embodiment. FIG. 3 will also be described with reference to FIGS. 1, 2, and 5. As shown in FIG. 3, the method for generating a joint uncertainty model can be described by three stages, namely, aleatoric modeling, epistemic modeling, and joint modeling. For simplicity, the method 300 will be described by these stages, but it is understood that the elements of the method 300 can be organized into different architectures, blocks, stages, and/or processes.

A. Aleatoric Modeling

At block 302, the host data is received. The host data may be received from any number of vehicle sensors and/or vehicle systems as described above. For example, the host data may be received from the one or more cameras 118. The host data, as well as the proximate data, may include model as well as past observations and historical data associated with the host vehicle 102 and the proximate vehicles 202-210.

Aleatoric uncertainty comes from inherent noise in the observations due to the probabilistic variability. To model this type of uncertainty during training, the neural network 108 incorporates noise parameters ($\mu_t$, $\Sigma y_t$) at time t, where denotes the p denotes the mean and $\Sigma y_t$ denotes the co-variance matrix from the ground-truth label $y_t$. Accordingly, at block 304, the method 300 includes determining a co-variance matrix based on the host data to create a prediction distribution. The co-variance matrix $\Sigma y_t$ is learned using a negative log-likelihood loss function as follows:

$$\mathcal{L}_A = \frac{1}{T}\sum_{t=Tobs+1}^{Tpred} \log(P(y_t | \mu_t, \Sigma y_t)) \qquad (1)$$

$$\frac{1}{2T}\sum_{t=Tobs+1}^{Tpred} \frac{\|y_t - \mu_t\|^2}{\Sigma_{y_t}^2} + \log \Sigma_{y_t}^2$$

Thus, ($\mu_t$, $\Sigma y_t$) can be predicted at T observed time-steps from time $T_{obs}+1$ to $T_{pred}$. Accordingly, Eq. 1 can be used to compute how likely the observations come from the posterior distribution $\mathcal{N}(\mu_t, \Sigma y_t)$. To avoid zeros in the denominator Eq. 1 may be rewritten as:

$$\mathcal{L}_A = \frac{1}{2T}\sum_{t=Tobs+1}^{Tpred} \exp(-s_{yt})\|y_t - u_t\|^2 + s_{yt} \qquad (2)$$

B. Epistemic Modeling

Epistemic uncertainty is caused by the model's weight parameters that are inadequately measured from the observations. To reduce this type of uncertainty during training, the neural network 108 may use additional measurements, employ dropout deep learning to avoid overfitting. Therefore, at block 306, the method 300 includes calculating a model distribution q(ω) based on the host data. In one embodiment, the dataset X, Y the posterior over weights P(ω|X, Y) is approximated using distribution q(ω).

At block 308, the method 300 includes generating multiple sample outputs using the distribution q(ω). For example, during inference, the neural network processing unit 122 of the neural network 108 may generate N samples from the distribution q(ω) of the network's learned weight parameters w using dropout.

At block 310, the method 300 includes calculating the variance based on the sampled outputs. For example, N number of noisy outputs are used to compute the variance $\Sigma y$ between the predicted outputs $f\hat{\omega}_i(x)$ and ground-truth labels $y_t$ at each time-step t as shown with respect to Eq. 2

$$\mathcal{L}_E(\omega, P) = -\frac{1}{T}\sum_{t=Tobs+1}^{Tpred} \log(P(y_t | f^{\hat{\omega}}(x_t))) \qquad (3)$$

$$\mu_t = \frac{1}{N}\sum_{i=1}^{N} f^{\hat{\omega}}(x)\hat{\omega} \sim q(w)$$

$$\sum_y = \frac{1}{N}\sum_{i=1}^{N} f^{\hat{\omega}\,i}(x)^T f^{\hat{\omega}\,i}(x) - \mu_y^T \mu_y$$

C. Joint Modeling

Rather than merely considering the future possibilities of the host vehicle 102, the proximate vehicles 202-210 are additionally considered. Accordingly, multiple possible futures of the proximate vehicles 202-210 is determined and the uncertainty of each of the possible futures.

At block 312, the method 300 includes combining the variances from aleatoric and epistemic models as a joint uncertainty model and update the prediction distribution. The neural network 108 updates the noise parameters ($\mu_y$, $\Sigma_y$) by adding the aleatoric uncertainty given in Eq. 2 to epistemic uncertainty in Eq. 3. The total variance and mean can then be computed according to:

$$\hat{y}_i, \sum_i^2 = f^{\hat{\omega}\,i}(x), \hat{\omega} \sim q(\omega)$$

$$\mu_y = \frac{1}{N}\sum_{i=1}^{N} \hat{y}_i$$

$$\sum_y = \frac{1}{N}\sum_{i=1}^{N} \hat{y}_i^T \hat{y}_i - \mu_y^T \mu_y + \frac{1}{N}\sum_{i=1}^{N} \sum_i^2$$

As a result, the neural network 108 outputs the noise parameters for the data posterior distribution $\mathcal{N}(\mu_t, \Sigma y_t)$ with the learned distribution of the distribution q(ω) during interference. Different node connections $\hat{\omega}_i$ are sampled for N times using dropout, and corresponding aleatoric and epistemic uncertainty according to Eq. 4.

Figure 4:
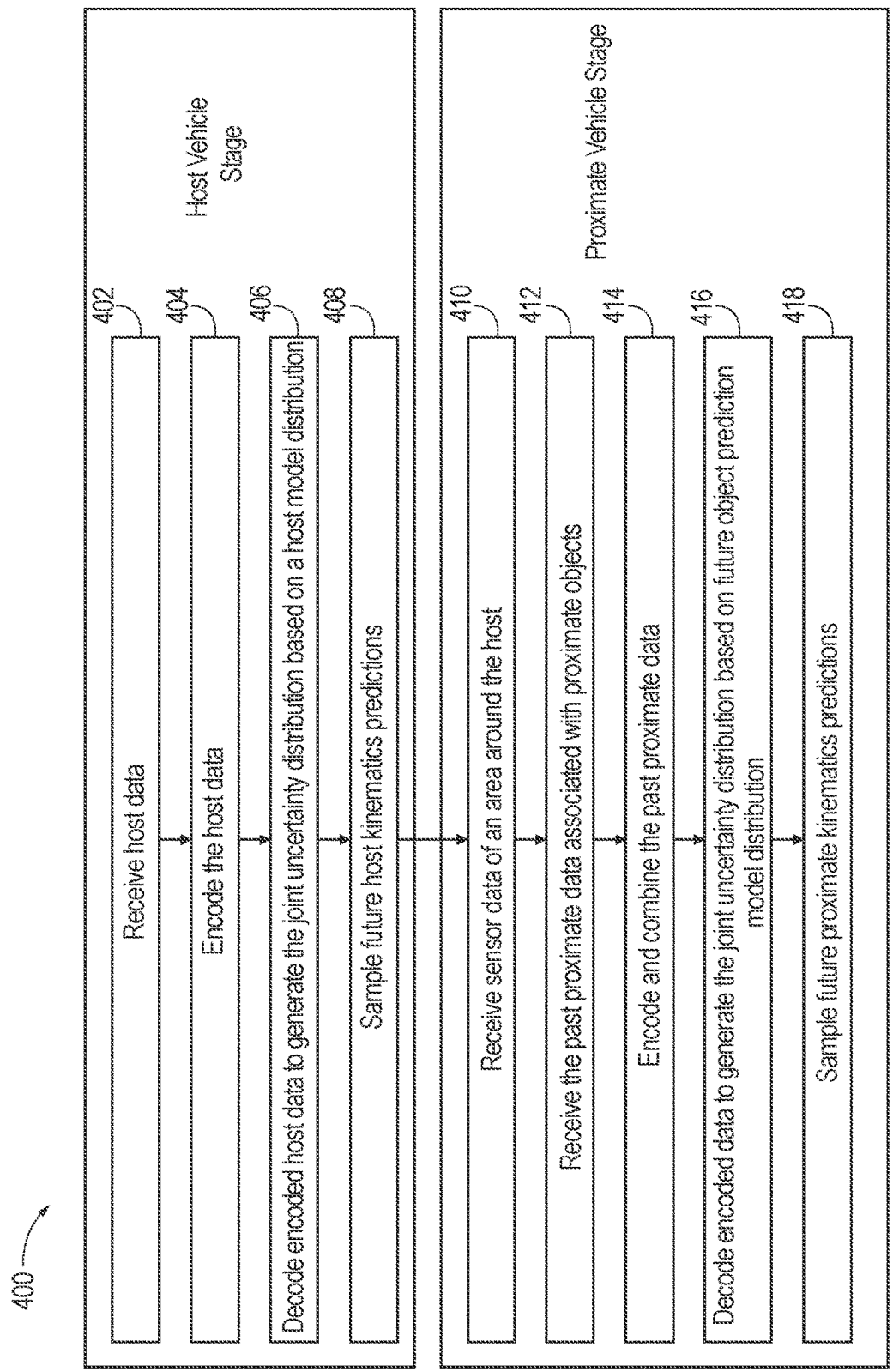
FIG. 4 is process flow for a host vehicle stage and a proximate vehicle stage associated with future object localization, according to one aspect

Referring now to FIG. 4, a method 400 for a host vehicle stage and a proximate vehicle stage associated with future object localization according to an exemplary embodiment. FIG. 4 will also be described with reference to FIGS. 1-3 and 5. Generally, the host vehicle stage corresponds to the host architecture 502 of FIG. 5 and the proximate vehicle stage corresponds to the proximate architecture 504. For simplicity, the method 400 will be described by these stages, but it is understood that the elements of the method 400 can be organized into different architectures, blocks, stages, and/or processes.

At block 402, the method 400 includes receiving the host data. The host data is associated with the movement of the host vehicle 102, referred to as ego motion. The host data is received by the data receiving module 130. As described above, the host data may be received from any number of vehicle sensors and/or vehicle systems as described above. For example, the host data may be received from the one or more cameras 118. The host data, as well as the proximate data, may include model as well as past observations and historical data associated with the host vehicle 102 and the proximate vehicles 202-210.

At block 404, the method 400 includes encoding the host data. For example, the data receiving module 130 may receive the host data and encode the host data according to the past ego motion encoder 506 shown in FIG. 5. In one embodiment, the past ego motion encoder 506 may be configured as gated recurrent unit (GRU) encoders. In one embodiment, multi-layer perception (MLP) may be used to convert the host data to the embedding of the GRU. The prediction output of the FRU may be a 5-dimensional vector at a future step in time from the observed time $T_{obs}+1$ to $T_{pred}$. In another exemplary embodiment, the host data encoder 124 may be configured to encode temporal information of past observations based on a first series of image frames of the environment 200. Accordingly, the past motion of the host vehicle 102, past ego motion, associated with the host data, is encoded.

At block 406, the method 400 includes decoding the encoded host data to generate a first joint uncertainty distribution based on an host model distribution. To generate future motion through a future ego motion decoder 508, shown in FIG. 5, drawn from the weights $\hat{\omega}_E$ the weight distribution $q(\hat{\omega}_E)$. The motion prediction module 132 then predicts future host vehicle positions and motions. For example, the motion prediction module 132, by virtue of the future ego motion encoder 510 generates multiple modes of prediction over the uncertainty distribution $P(E|x_E, \hat{\omega}_E)$ over velocity, v, and a yaw rate θ, where E={v, θ} is the future ego-motion and $x_E$ is past ego motion. The motion prediction module 132 generates the first joint uncertainty distribution based on an initial joint uncertainty model and the host data. Furthermore, the future ego motion encoder 510

At block 408, the method 400 includes sampling host kinematic predictions based on the first joint uncertainty distribution and the host data. The host kinematic predictions predict future motions of host vehicle 102.

At block 410, the method 400 includes receiving sensor data from around the host vehicle. At block 412, proximate data is received based on sensor data. The proximate data may include past observations and historical data associated with the the proximate vehicles 202-210. The proximate data is received by the data receiving module 130. In some embodiments, the proximate data may be received from the proximate vehicles. The proximate data may also be calculated based on the information received from the one or more cameras 118. For example, the proximate data may be calculated based on the first series of images. The motion, position, speed, velocity, and trajectory, among others of one or more of the proximate vehicles 202-210 may be determined based on the first series of image frames of an environment 200 from the host vehicle 102.

Additionally or alternatively, the proximate data may be received via computer communication including V2V communication. Accordingly, the vehicle sensors of the host vehicle 102, including, for example, a transceiver (not shown) may include information about objects in the environment 200 at block 410. In response to receiving that information, the data receiving module 130 may determine that the information is proximate data.

At block 414, the method 400 includes encoding the proximate data. For example, the data receiving module 130 may be received and encoded according to the past ego motion encoder 506 shown in FIG. 5. In one embodiment, the past flow encoder 512 may be configured as gated recurrent unit (GRU) encoders. In a similar manner as described above, multi-layer perception (MLP) may be used to convert the host data to the embedding of the GRU. Additionally or alternatively, the proximate data may be encoded using a bounding box encoder.

At block 416 the method 400 includes decoding the encoded data to a uncertainty distribution based on the proximate data and the future object prediction. Accordingly, a second joint uncertainty distribution is generated based on the initial joint uncertainty model. In particular, to model the future behavior of the proximate vehicles 202-210 respective to the noisy ego-motion, the object localization module decoder 134 uses the output of future ego-motion prediction from the motion prediction module 132 as a prior. In this way, a bounding box decoder 514 reacts to each modality of the host vehicle 102 while predicting future motion of the proximate vehicles 202-210. Similar to joint uncertainty modeling of the future ego motion decoder 508, weights $w_B$ for the bounding box decoder 514 are drawn from the weight distribution $q(w_B)$. The object localization module decoder 134 estimates the noise parameters for the center ($c_x$, $c_y$) and the dimension (w, h) of the bounding box using the weights $w_B$.

At block 418 the method 400 includes sampling proximate kinematic predictions based on the second joint uncertainty distribution and the host data. The proximate kinematic predictions predict future motions of proximate vehicles 202-210. Accordingly, the path of the host vehicle 102 may be predicted as host kinematic predictions based on the first joint uncertainty distribution and the path of the proximate vehicles 202-210 may be predicted as proximate kinematic predictions based on the second joint uncertainty distribution. For example, a bounding box prediction may be given by B={$c_x$, $c_y$, w, h} by sampling from the uncertainty distribution $P(B|G, w_B, E,)$, and $G=\Phi(x_F)$ and concatenation of past flow $x_F$ and bounding box $x_B$ encoding.

Additionally or alternatively, the sampling may include displaying predicted trajectories of the one or more proximate vehicles based on the host kinematic predictions and the proximate kinematic predictions. Suppose that the host data includes the first series of image frames of the environment 200. The object localization module decoder 134 is further configured to generate a second series of image frames of the environment 200 including predicted trajectories of the one or more proximate vehicles based on the host kinematic predictions and the proximate kinematic predictions. For example, the bounding boxes and trajectories may be displayed for a user and/or vehicle occupant. Returning to FIG. 2, for the proximate vehicle 202, the bounding boxes 212 and/or the predicted trajectories 214 and 216 may be shown.

The systems and method described herein may use the pre-trained ego-motion prediction module with epistemic uncertainty and is trained jointly with future object localization. The use of these uncertainty models to condition the motion forecast of proximate vehicles 202-210 significantly improves the overall performance. This comparison validates the use of the uncertainty to model more robust interactions of proximate vehicles 202-210 with the host vehicle 102. The data receiving module 130, the motion prediction module 132, and the object localization module decoder 134 are trained with aleatoric uncertainty and epistemic uncertainty as described with respect to FIG. 3. These baseline models further decrease the error rate compared aleatoric uncertainty and epistemic uncertainty alone so that it better predicts future motion of the proximate vehicles 202-210 as well as the bounding box locations and scales associated with the sampled host kinematic predictions and the sampled proximate kinematic predictions.

Figure 6:
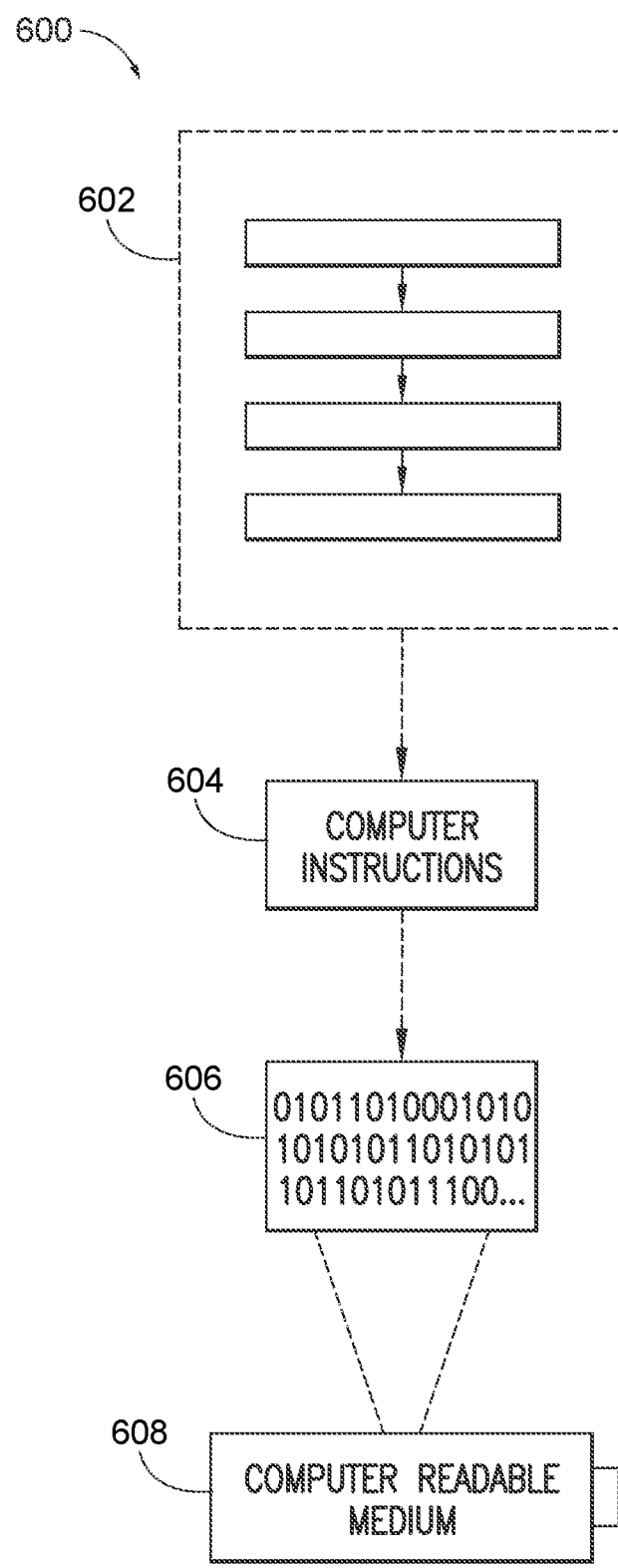
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, modifications may be made to this configuration without departing from the scope or spirit of the claimed subject matter.

Figure 7:
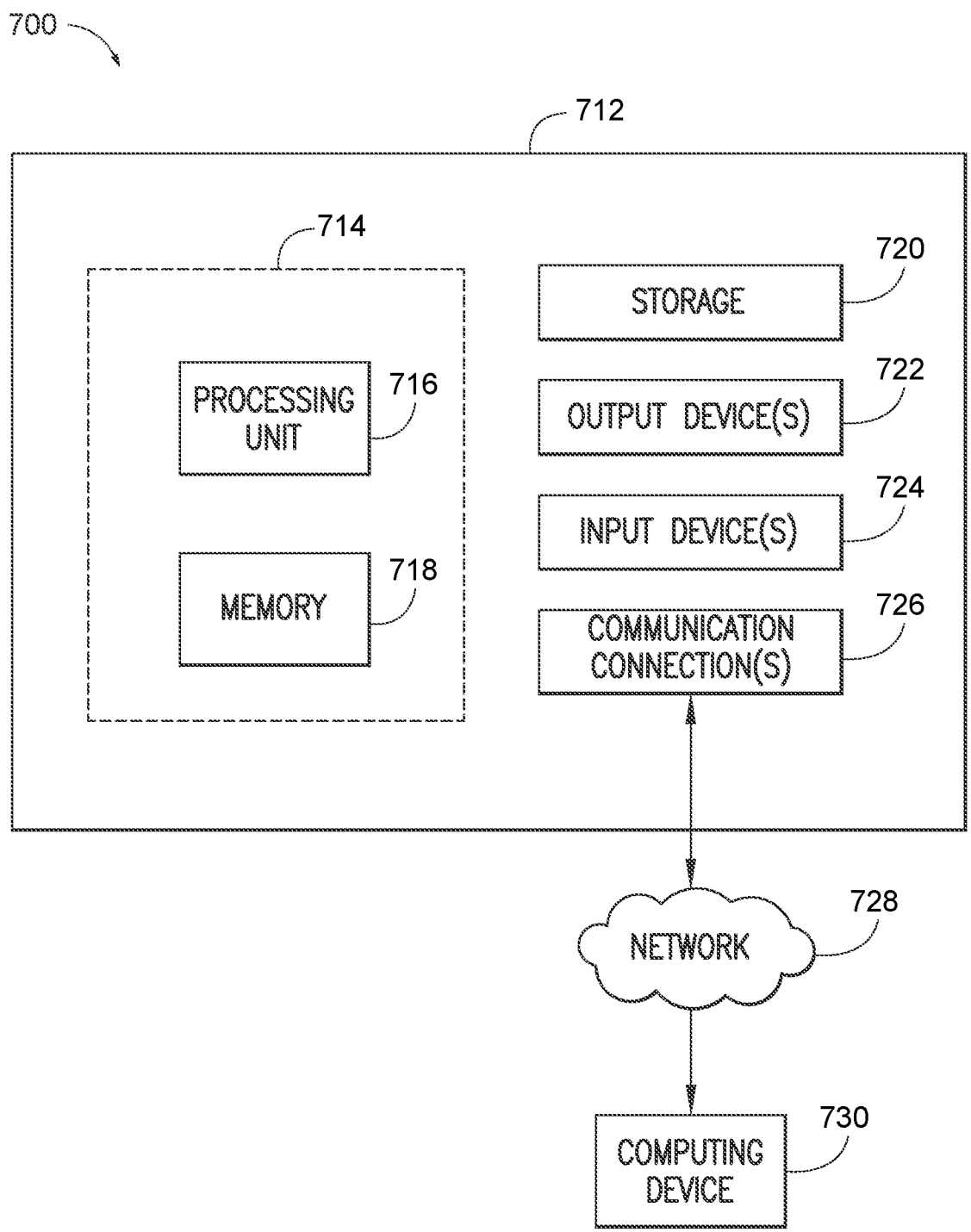
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, nonvolatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by the processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for future object localization, the system comprising:
    one or more vehicle sensors for capturing host data associated with a host vehicle, wherein the host data includes a first series of image frames of an environment from the host vehicle and temporal information of past observations of the host vehicle based on the first series of image frames of the environment; and
    a processor, the processor having:
    a data receiving module, implemented via the processor, identifying one or more proximate vehicles within sensor range in the environment based on one or more of the host data and proximate data received from the one or more proximate vehicles, wherein the proximate data includes historical data of the one or more proximate vehicles as determined based on the first series of image frames of the environment;
    a motion prediction module, implemented via the processor, configured to:
    encode the host data in a host vehicle stage;
    decode the encoded host data in the host vehicle stage to generate a first joint uncertainty distribution based on an initial joint uncertainty model and a host model distribution that includes the host data associated with the host vehicle; and
    sample host kinematic predictions of future motions of the host vehicle in the host vehicle stage based on the first joint uncertainty distribution and the host data; and
    an object localization module, implemented via the processor, configured to:
    encode the proximate data in a proximate vehicle stage;
    decode the encoded proximate data including proximate positions or proximate motions of the one or more proximate vehicles in the proximate vehicle stage to generate a second joint uncertainty distribution based on the initial joint uncertainty model and an object prediction model distribution of the host kinematic predictions of the host vehicle as a prior; and
    sample proximate kinematic predictions in the proximate vehicle stage based on the second joint uncertainty distribution and the proximate data.

2. The system for future object localization of claim 1, wherein the object localization module is further configured to generate a second series of image frames of the environment including predicted trajectories of the one or more proximate vehicles based on the host kinematic predictions and the proximate kinematic predictions.

3. The system for future object localization of claim 2, wherein the data receiving module is further configured to identify the one or more proximate vehicles within the environment based on a convolutional neural network (CNN).

4. The system for future object localization of claim 1, wherein the second joint uncertainty distribution is an update of the first joint uncertainty distribution.

5. A computer implemented method for future object localization, the method comprising:
    receiving host data from a host vehicle and proximate data from one or more proximate vehicles within sensor range in an environment of the host vehicle, wherein the host data includes a first series of image frames of the environment from the host vehicle and temporal information of past observations of the host vehicle based on the first series of image frames of the environment, and the proximate data includes historical data of the
    one or more proximate vehicles as determined based on the first series of image frames of the environment;
    encoding the host data in a host vehicle stage;
    decoding the encoded host data in the host vehicle stage to generate a first joint uncertainty distribution based on an initial joint uncertainty model and a host model distribution that includes the host data received from the host vehicle;
    sampling host kinematic predictions of future motions of the host vehicle in the host vehicle stage based on the first joint uncertainty distribution and the host data;
    encoding the proximate data in a proximate vehicle stage;
    decoding the encoded proximate data including proximate positions or proximate motions of the one or more proximate vehicles in the proximate vehicle stage to generate a second joint uncertainty distribution based on the initial joint uncertainty model and an object prediction model distribution of the host kinematic predictions of the host vehicle as a prior;
    sampling proximate kinematic predictions in the proximate vehicle stage based on the second joint uncertainty distribution and the proximate data; and
    displaying predicted trajectories of the one or more proximate vehicles based on the host kinematic predictions and the proximate kinematic predictions.

6. The computer implemented method for future object localization of claim 5, wherein the predicted trajectories are displayed with a second series of image frames of the environment.

7. The computer implemented method for future object localization of claim 6, further comprising identifying the one or more proximate vehicles within the environment based on a convolutional neural network (CNN).

8. The computer implemented method for future object localization of claim 5, further comprising:
    receiving the object prediction model distribution; and
    combining the proximate positions or the proximate motions of the one or more proximate vehicles based on the proximate data.

9. The computer implemented method for future object localization of claim 5, wherein the initial joint uncertainty model is based on aleatoric modeling and epistemic modeling of the host data.

10. A non-transitory computer readable storage medium storing instructions that when executed by a computer, which includes a processor performing a method, the method comprising:
    receiving host data from a host vehicle and proximate data from one or more proximate vehicles within sensor range in an environment of the host vehicle, wherein the host data includes a first series of image frames of the environment from the host vehicle and temporal information of past observations of the host vehicle based on the first series of image frames of the environment, and the proximate data includes historical data of the one or more proximate vehicles as determined based on the first series of image frames of the environment;
    encoding the host data in a host vehicle stage;
    decoding the encoded host data in the host vehicle stage to generate a first joint uncertainty distribution based on an initial joint uncertainty model and a host model distribution that includes the host data received from the host vehicle;
    sampling host kinematic predictions of future motions of the host vehicle in the host vehicle stage based on the first joint uncertainty distribution and the host data;
    encoding the proximate data in a proximate vehicle stage;
    decoding the encoded proximate data including proximate positions or proximate motions of the one or more proximate vehicles in the proximate vehicle stage to generate a second joint uncertainty distribution based on the initial joint uncertainty model and an object prediction model distribution of the host kinematic predictions of the host vehicle as a prior;
    sampling proximate kinematic predictions in the proximate vehicle stage based on the second joint uncertainty distribution and the proximate data; and
    displaying predicted trajectories of the one or more proximate vehicles based on the host kinematic predictions and the proximate kinematic predictions.

11. The non-transitory computer readable storage medium of claim 10, wherein the predicted trajectories are displayed with a second series of image frames of the environment.

12. The non-transitory computer readable storage medium of claim 11, the method further comprising identifying the one or more proximate vehicles within the environment based on a convolutional neural network (CNN).

13. The non-transitory computer readable storage medium of claim 10, wherein the processor is further configured to:
    receiving the object prediction model distribution; and
    combining the proximate positions or the proximate motions of the one or more proximate vehicles based on the proximate data.

14. The non-transitory computer readable storage medium of claim 10, wherein the initial joint uncertainty model is based on aleatoric modeling and epistemic modeling of the host data.

15. The non-transitory computer readable storage medium of claim 14, wherein the aleatoric modeling is based on the host data and a prediction distribution.

16. The non-transitory computer readable storage medium of claim 14, wherein the epistemic modeling is based on a variance of the object prediction model distribution.

* * * * *